Dec. 17, 1929. W. C. SHANLEY 1,739,525
LOADING AND UNLOADING DEVICE FOR TANK CARS
Filed Aug. 26, 1926 5 Sheets-Sheet 1
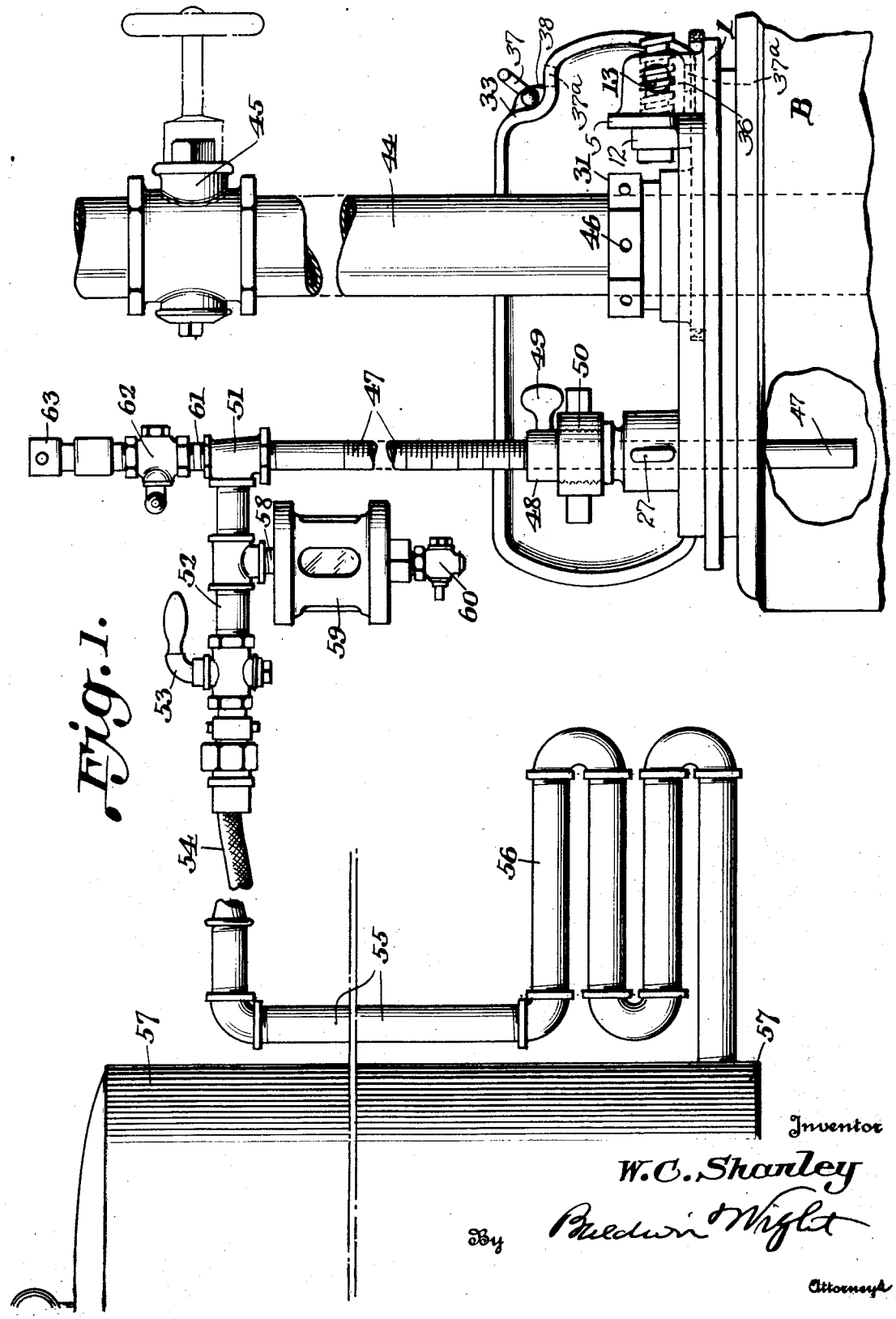

Dec. 17, 1929.  W. C. SHANLEY  1,739,525
LOADING AND UNLOADING DEVICE FOR TANK CARS
Filed Aug. 26, 1926  5 Sheets-Sheet 2
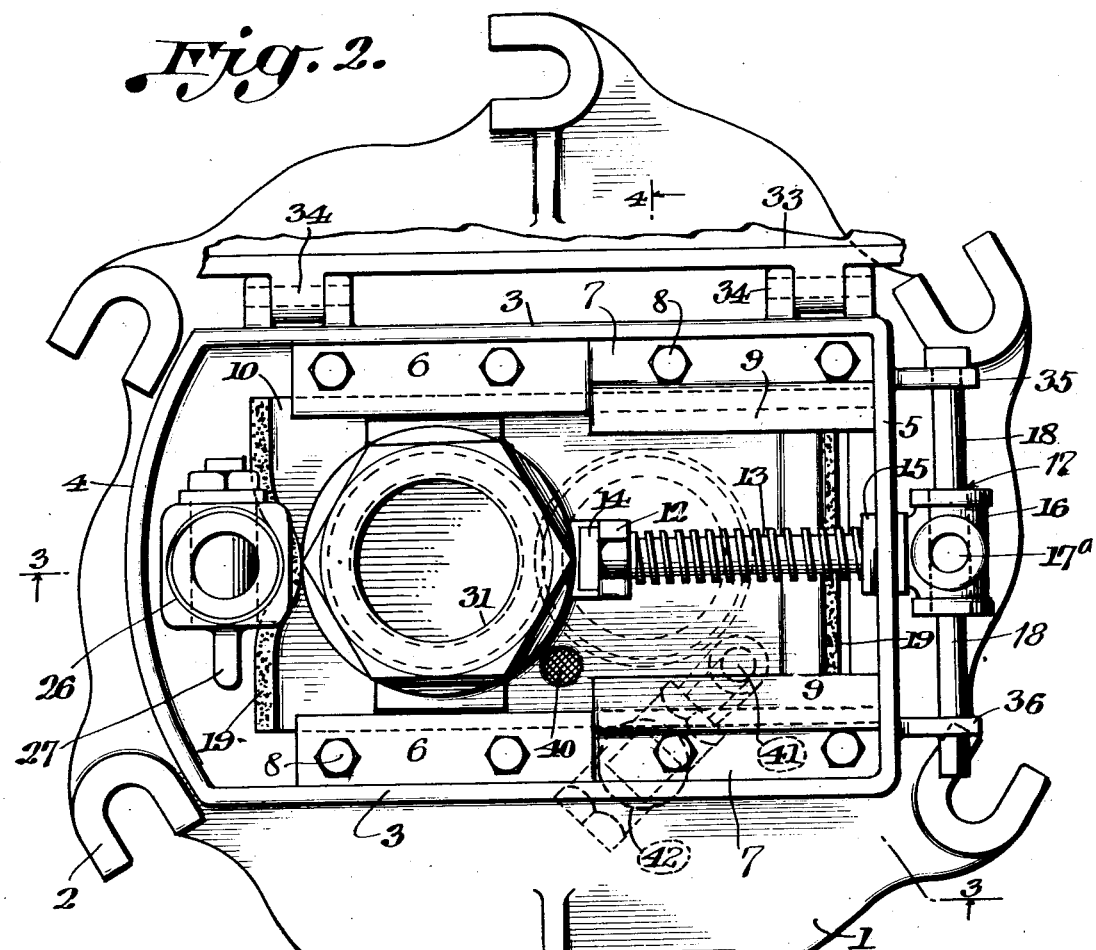
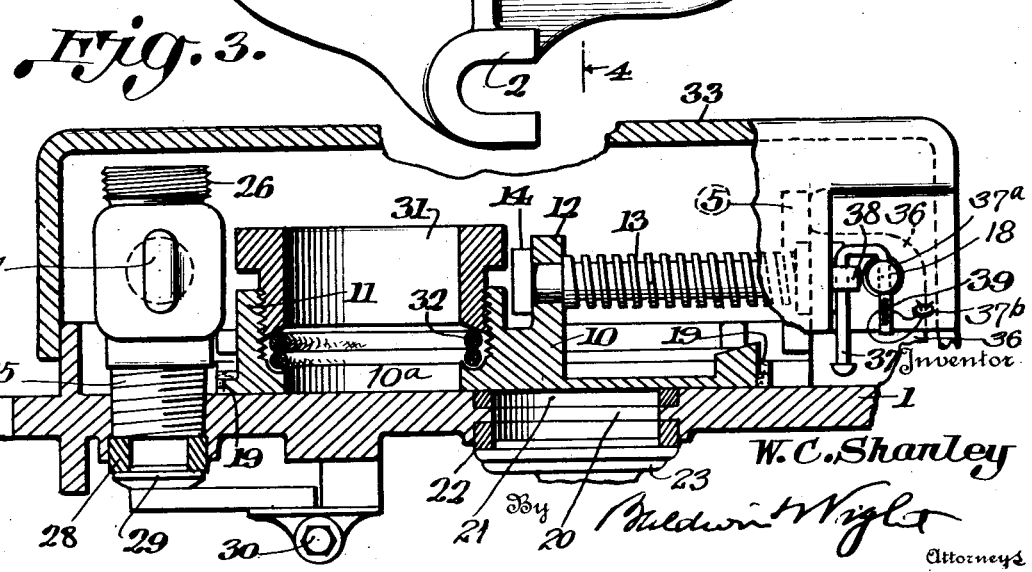

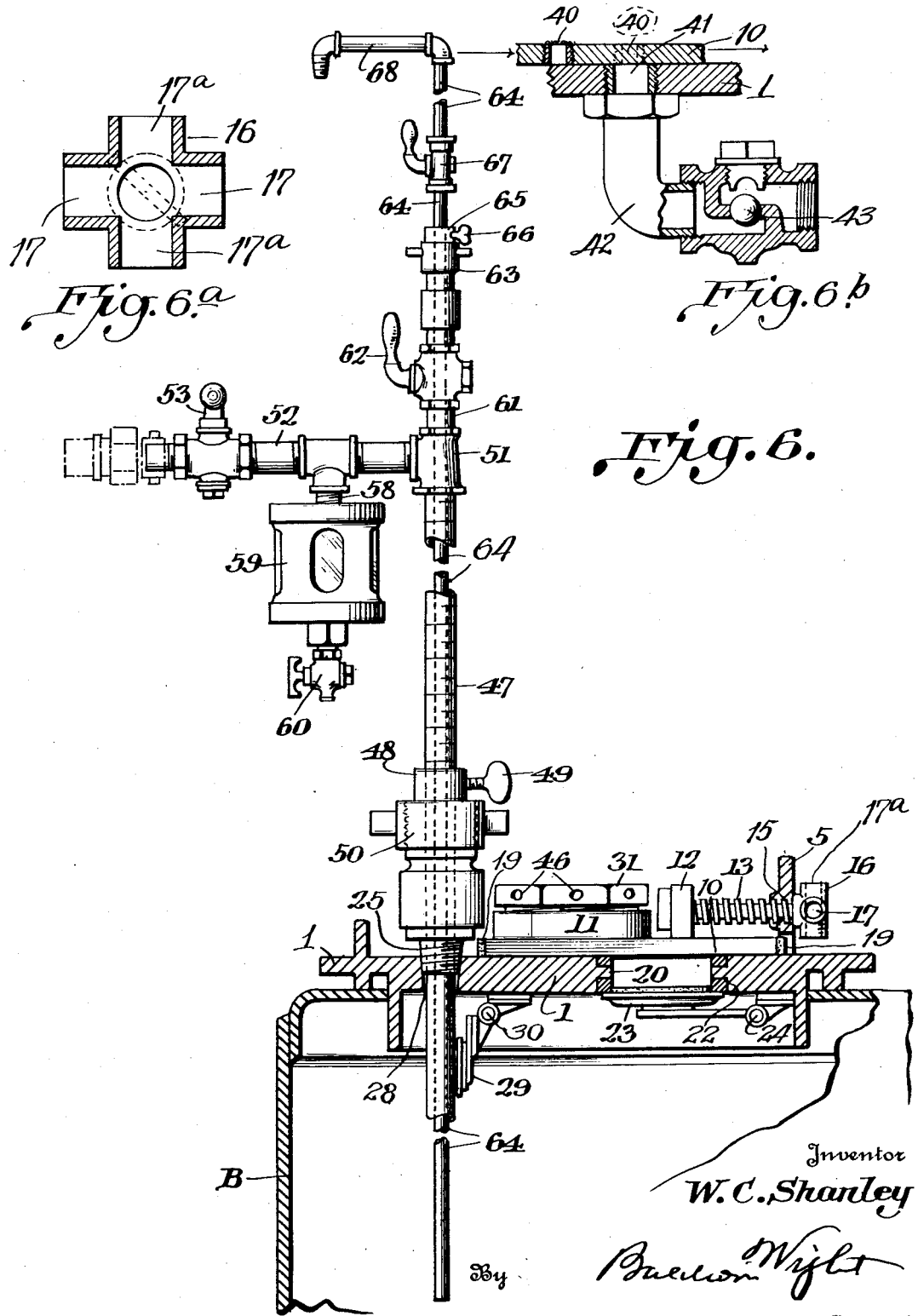

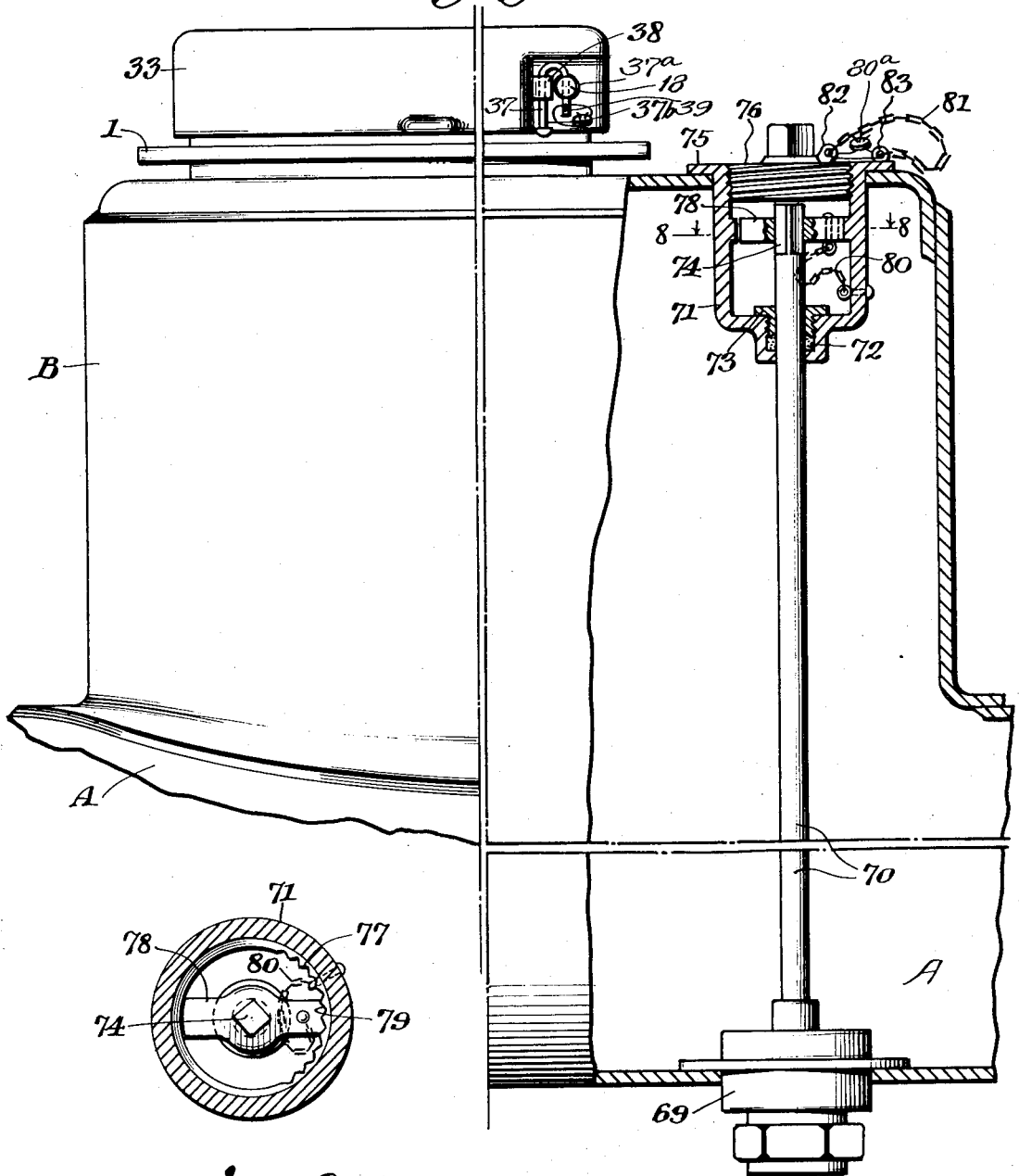

Patented Dec. 17, 1929

1,739,525

UNITED STATES PATENT OFFICE

WILLIAM C. SHANLEY, OF DES MOINES, IOWA

LOADING AND UNLOADING DEVICE FOR TANK CARS

Application filed August 26, 1926. Serial No. 131,801.

This invention relates to simple and efficient means for loading or unloading tank cars with gasoline, kerosene or similar inflammable liquids which are apt to have a certain percentage of free gas when being handled. It comprises in its preferred form a cover for the dome of a tank car which does not need to be removed except for cleaning or repairing the car. This cover contains a slidable valve mechanism which when closed may be locked in position and sealed and through which neither liquid nor gas can escape.

Another feature of the invention is the provision of a graduated gage pipe by which the contents of the car may be accurately determined and which gives a visual indication when the car is filled to the desired depth.

A further feature of the invention is the provision of means which in the embodiment herein disclosed is associated with a gage pipe for obtaining a sample of the liquid from any desired depth.

Another feature of the invention is the provision of means for unloading the tank car by a bottom valve which is so constructed and arranged that it is positively locked against accidental opening but is readily accessible from outside the car as desired.

Further features of the invention will be apparent from the following detailed description and the appended claims.

In the drawings:

Figure 1 is a side elevation disclosing the general arrangement of most of the elements of the invention.

Figure 2 is a top plan view of the dome cover with the lid therefor opened, a portion of the lid or cover being indicated.

Figure 3 is a section on the line 3—3 of Figure 2 with the lid in closed position and some parts in elevation.

Figure 6 is a side elevation with parts in section of the dome with its cover, the graduated tube and the means for obtaining a sample of the liquid.

Figure 4:
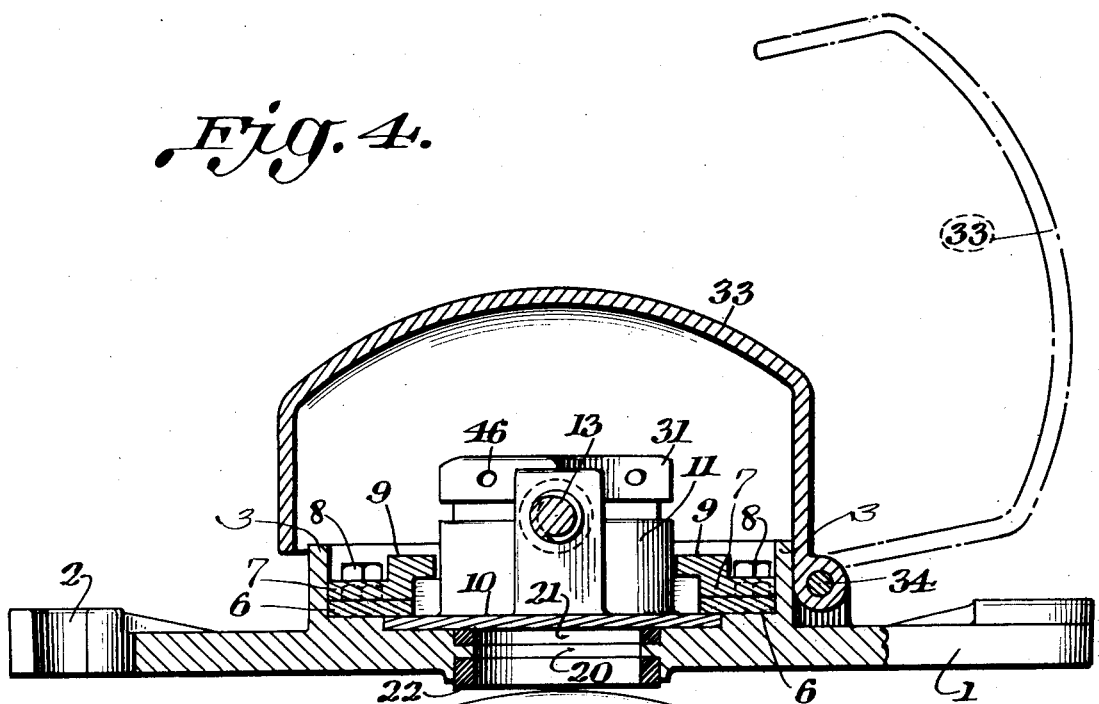
Figure 4 is a section on the line 4—4 of Figure 2 with two positions of the lid shown in full and dotted lines.
Figure 5:
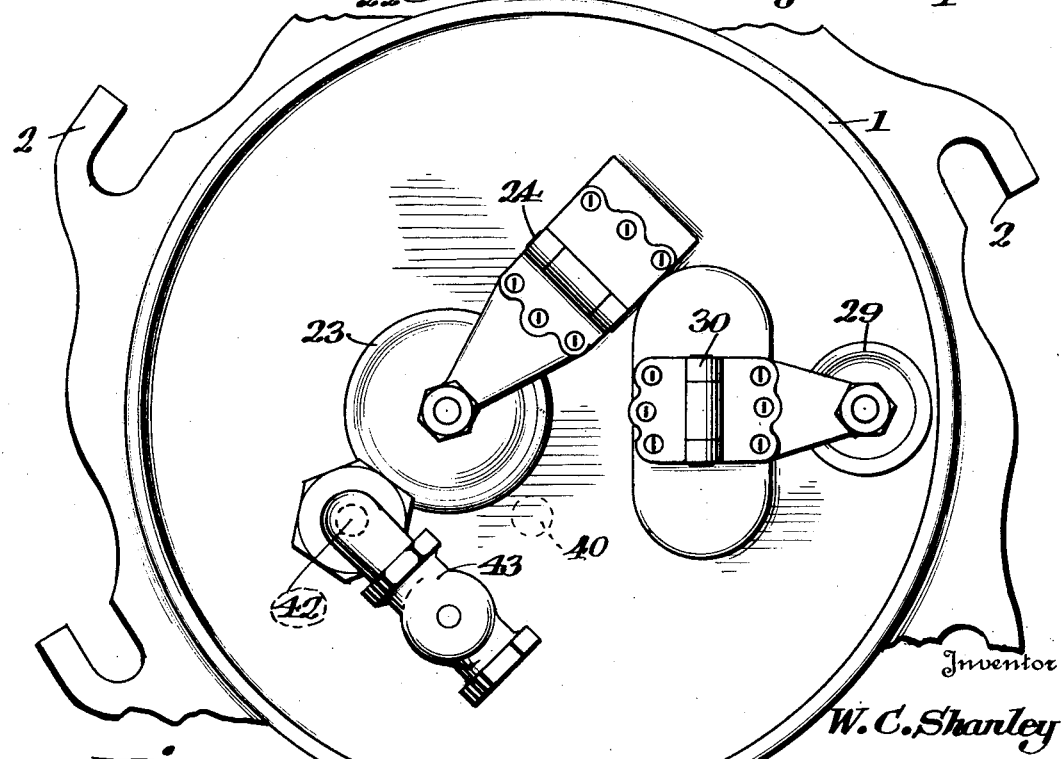
Figure 5 is a bottom plan view of the dome cover, showing certain valves which it carries.

Figure 6$^a$ is a sectional view of the headed outer end of the valve stem of the main sliding valve, which controls the opening in the dome cover, which receives the main supply and delivery pipe.

Figure 6$^b$ is a detailed view, partly in elevation and partly in section, of a device for admitting air to the tank while it is being emptied.

Figure 7 is a vertical section with parts in elevation showing the means for opening and closing the bottom valve.

Figure 8 is a section on the line 8—8 of Figure 7.

There is illustrated in the drawings a fragment of a conventional tank car A with the usual dome B. This invention provides a dome cover 1, of generally circular outline provided with a plurality of retaining lugs 2 adapted to be engaged by suitable retaining devices on the dome. On the top of the dome cover is formed a generally rectangular enclosure by side walls 3, a slightly curved end wall 4 and an opposite end wall 5 which is spaced at the bottom from the surface of the cover 1. Guide strips 6 are provided at the side of the walls 3 and overlying these are other shorter guide strips 7 held in position by bolts 8 and having projecting flanges 9 for a purpose hereinafter set forth.

Guided in its movements by the above mentioned guides is valve mechanism comprising a sliding flange plate 10 which carries an upwardly extending circular portion 11 screw-threaded at its interior. The valve plate 10 also has an upstanding lug 12 provided with a slot open at its upper side and the valve stem 13 rests within this slot at one end and one end of the stem has an enlargement or head, which prevents endwise movement of the stem relating to the lug. This valve stem is screw threaded throughout the greater portion of its length and passes through an internally threaded enlargement 15 on the end wall 5. At its outer end the valve stem is provided with a cross head 16 having two openings 17 and 17$^a$ (Fig. 6$^a$)

passing through it at right angles. These openings are designed to receive a rod or bolt 18 for purposes hereinafter described. At each end of the sliding valve plate 10 are provided pads 19 which may be saturated with glycerine and these not only act as a seal but tend to keep the surface of the cover plate 1 upon which the valve plate 10 slides free from dirt or extraneous matter.

The dome cover 1 is provided with a circular opening 20 therethrough which has a brass seat 21 at its upper side upon which the valve plate 10 slides and a brass seat 22 at its lower side with which cooperates a check valve 23. This check valve is mounted on the under side of the dome cover being pivoted thereto by a hinge 24 which includes a spring (not shown) which tends to move the check valve to closed position.

A short pipe section 25 is screw threaded as shown in (Fig. 6) on one end and screws into an opening in the plate 1. The upper end of said pipe section is screw threaded at 26 (Fig. 3) for purposes hereinafter set forth and this pipe section is provided with a valve 27. A brass seat 28 is carried by the under side of the dome cover 1 and cooperating therewith is a check valve 29 pivoted to the under side of the dome cover by a hinge 30 which is also provided with a spring (not shown) for returning the same to closed position and holding it there.

A brass packing gland 31 is screw threaded thereto into the upper end of the extension 11 of the valve plate and packing 32 is provided which is engaged by the lower edge of the gland and may be compressed by screwing the gland into position and thus expanded laterally.

The dome cover is provided with a lid 33 hinged thereto as indicated at 34. The cover is provided with aligned openings 37ª. The end wall 5 above described is provided with two perforate lugs 35 and 36 the openings of which are in alignment and so positioned that the opening 17 through the head 16 and the openings 37ª in the cover may be brought into alignment also. When these parts are thus aligned the bolt 18 is passed through the openings in the cover in the lug 35, head 16 and lug 36 and the outer end of this bolt is provided with a small opening through which may pass one end of a U-bolt 37, the other end passing through a perforated lug 38 on the cover 33. One end of this U-bolt is provided with a head which prevents its withdrawal from the lug 38 and the other end is provided with a slot 39 through which may be passed the usual car seal, 37ᵇ. It will be observed that when the cover or lid 33 is closed and the bolt 18 passed through the openings 37ª in the cover and through the lugs 35 and 36 and through the cross head 16 the lid or cover cannot be raised, and the valve stem cannot be turned, and when the U-bolt and seal are applied the bolt 18 cannot be withdrawn without breaking the seal.

The sliding plate 10 is provided with a small port 40 preferably provided with wire gauze and the dome cover is provided with a similar port 41 to which is connected a short section of pipe 42 provided with a check valve 43 (Fig. 6ᵇ) so positioned that pressure within the car will tend to close the valve but it will open to suction, or when the tank is being emptied so that air may be admitted to the tank to prevent the formation of a vacuum.

Whenever the cylindrical extension 11 is positioned over the opening 20 in the dome cover 1, there may be passed through such aligned openings a pipe 44 provided with a valve 45. When this pipe is inserted to the desired position the packing gland 31 may be turned by inserting a suitable handle into openings 46 therein, thus compressing the packing and expanding it laterally thus not only preventing passage of liquid or gas around the pipe 44 but clamping the pipe in its desired position. This pipe 44 may be connected by a hose or system of piping to any desired source of supply.

A pipe 47 is provided with a scale on its outer surface and has a sliding collar 48 adapted to be clamped in any desired position on the pipe by a set screw 49 and the pipe 47 also carries a slip joint coupling 50 of well known type. This slip joint coupling is adapted to engage the threaded portion 26 of the pipe 25 above mentioned so that by this construction the pipe 47 may be inserted within the tank car to any desired depth and held by the collar 48 in that position.

The upper end of the pipe 47 is provided with a T-coupling 51 from which extends a side branch 52 provided with a valve 53 and to the end of this branch may be attached a hose 54 or system of piping connected by a pipe 55 and a condensing coil 56 which communicates with a storage tank 57. The pipe 52 has a side branch 58 communicating with a sight gage 59 provided with a valve 60 controlling the outlet therefrom.

To the upper end of the T-coupling 51 is attached a short section of pipe 61 provided with a valve 62 and a slip joint coupling 63. A smaller pipe 64 is adapted to extend through the pipe 47 when the valve 62 is in open position and may be positioned in any desired relation to the pipe 47 by means of a collar 65 and set screw 66, said collar resting upon the top of the slip joint coupling 63. This pipe 64 is provided near its upper end with a valve 67 and may terminate in an elbow 68 of any desired form.

There is provided at the bottom of the tank a valve 69 which may be of any usual construction adapted to be operated by a valve stem 70. This valve stem extends at its upper end into a cup-shaped casing 71 and there is provided packing 72 and a packing gland 73 for forming a tight engagement between the valve stem and casing. The extreme upper end of the valve stem 70 is of square or other non-circular shape as indicated at 74. The cup-shaped casing 71 has a flange 75 which is fixed to the top of the dome. It is also internally screw threaded at its upper end and a brass plug 76 is adapted to screw thread into said casing and close the upper end of the same.

The inside of the cup member 71 has a portion of its periphery toothed as indicated at 77 and a steel retaining member 78 has a non-circular opening to fit over the end 74 of the valve stem and has teeth 79 adapted to engage the teeth 77. It is obvious that when this retaining member 78 is in position the valve stem cannot be rotated. This member 78 is connected to the cup 71 by means of a short chain 80 which prevents its accidental loss. A chain 81 also connects a loop 82 carried by the plug 76 with a loop 83 on the cup member 71. These loops 82 and 83 are so proportioned that a car seal may be passed through the same so that the plug cannot be withdrawn without breaking the seal, and therefore the bottom valve cannot be opened without authority.

The operation of the mechanism and its use may be apparent from the above description but it is thought desirable to briefly recapitulate the same. Assuming that the tank is empty and the dome cover with sliding valve is in the position shown in Figures 2 and 3, and it is desired to load the tank through the top thereof, the following procedure will be adopted.

The railroad seal is broken and the bolt 18 removed. The cover 33 may then be swung to open position and the bolt 18 may be employed as a handle and passed into one or the other of the openings 17$^a$ for the purpose of turning the valve stem 13. A continued turning movement of the valve stem will move the valve plate 10 until the opening 10$^a$ through the extension 11 will register with the opening 20 in the cover plate 1. At the same time the opening 40 in the valve plate will register with the opening 41 in the cover plate. The pipe 44 may now be inserted through these registering openings 10$^a$ and 20, the valve 45 at first preferably being closed. As the pipe is inserted it will itself open the check valve 23. The packing gland 31 is now tightened in order to retain the pipe in desired position and prevent escape of gas or liquid around the same. A desired hose connection is made to the upper end of the pipe 44. The valve 43 is held in closed position by the pressure within the tank.

The collar 48 on the pipe 47 is set at the desired position corresponding to the number of gallons which the tank is to receive, and said pipe is passed through the short pipe 25, the valve 27 being at first open. When the pipe 47 has been moved into the tank to the desired extent, the collar 48 will rest on the coupling 50, which is made tight to the pipe section 25. As the pipe 47 enters the tank the valve 29 is automatically pushed to open position. The hose coupling 54 is connected to the pipe 52 and the valves 60 and 62 should be closed. The valve 45 in the pipe 44 is now opened which permits the liquid to pass through the pipe 44 into the tank. The air, gas or vapor passes out through the pipe 47 through valve 53 which has now been opened and through the condensation coil 56 into the storage tank 57 or similar container. When the tank has been filled so that it submerges the end of the pipe 47 the liquid will be forced up through this pipe and into the sight gage 59 which indicates that the tank is filled to the desired number of gallons. The valve 45 in the pipe 44 is then closed and also the valve 53. However, if the operator should forget to shut these valves, the liquid would be forced through into the storage tank 57 and thus eliminate any hazard of overflowing the tank car.

After the tank is filled the hose 54 is removed, the slip joint coupling 50 is loosened and the pipe 47 with its connected parts is removed. The spring check valve 29 thereupon automatically closes. The cut-off valve 27 is then closed. The hose connection is disconnected from the pipe 44, the packing gland 31 is loosened and the pipe 44 is removed, at which time the spring checked valve 23 automatically closes the opening 20. The sliding valve plate is moved back to the Figure 2 position by reversing the operation previously described. The cover 33 is moved to closed position, the rod 18 inserted through the cross head 16 and through the lugs 35, 36 and the U-bolt 37 passed through the end of the bolt 18. The usual car seal 37$^b$ is applied to this U-bolt.

In unloading, the above sequence of operations is reversed and at first the valves 53 and 67 should be closed. The pipe 47 is inserted very slowly into position through valve 27 and past the check valve 29 and the gas or vapor will escape through the valve 60 in the sight gauge. As soon as the pipe 47 is submerged, the liquid will pass up into the sight gage 59 at which time the valve 60 must be closed and the collar 48 fastened in position by the set screw 49 to hold the pipe 47 in this position. In this way the contents of the tank may be determined.

This portion of the operation, that is, the adjustment of the pipe 47, should precede the opening of the slide valve which is brought about in an obvious manner. The pipe 44 is then positioned as above described and connected to a source of suction. As the liquid is withdrawn from the car the check valve 43 in the pipe 42 automatically opens and allows air to enter to the tank, thus preventing the formation of a vacuum and the consequent collapse of the tank. If the unloading is brought about by syphonic action the operation is the same. If it is desired to unload by air pressure introduced through the pipe 47 the collar 48 is set so that the end of the pipe 47 will just pass below the check valve 29. Valves 60 and 62 must be closed and the source of air pressure is connected to the end of the pipe 52 after which the valve 53 is opened.

If it is desired to unload the car through the bottom outlet the hose is connected to the valve 69, the railroad seal 80ᵃ is broken, the plug 76 removed and the locking stem member 78 is also removed. The valve stem 70 may then be turned by means of a socket wrench applied to the upper non-circular end of the same. The slide valve 10 is moved to open position in order to bring the openings 40 and 41 into register to permit entry of air through the car as the liquid escapes into the valve 69. After the car is empty a reverse operation will place the parts in closed position. It will be noted that the chain 80 prevents accidental loss of the locking member 78.

If at any time, either when loading or unloading, it is desired to obtain a sample for analysis from any desired depth the valve 27 is opened and the pipe 47 positioned as above described. The valve 62 is now opened and the pipe 64 is passed through the pipe 47 into the car and to the desired depth as determined by the setting of the collar 65 upon this pipe. The pipe 64 is then locked in desired position by the slip joint coupling 63. After the pipe 64 is thus positioned the valve 67 is opened and the pressure in the car will cause the liquid to pass through the end section 68 into any desired container. There would be drawn off the equivalent of the contents of the pipe 64 after which the valve 67 is closed and the portion removed placed in another container. The valve 67 is now opened and the resulting sample will be from the desired depth.

It is believed to be obvious from the above description that the invention comprises a number of valuable features which have definite relation to each other and combine to form a simple and efficient means for loading or unloading tank cars without any danger. The valves 23 and 29 will close automatically when the pipes 44 and 47 are withdrawn even if the operator forgets to close the other valves. The means for obtaining a sample for analysis and the means for determining the amount of liquid in the car either at the beginning of the unloading or at the end of the loading operation enables these results to be obtained quickly and efficiently.

It is also obvious that various features of the invention may be modified quite widely and that portions of the device may be used alone or in connection with other devices without in any way departing from the spirit of the invention which is to be regarded as limited only by the scope of the appended claims.

It will be observed that when the tank is filled and is in transit, the cover 33 is locked and sealed so that it cannot be opened without authority, and the valve controlling the main filling and discharge opening of the tank is closed, locked, and sealed. The filling and discharge opening of the tank is also closed by the check valve 23. The opening through the pipe 28 in the cover plate for the discharge of vapors is closed by the valves 27 and 29. Thus there is no possibility for the escape of either liquid or vapor.

In unloading, the seal 37ᵇ is first broken, the bolt 18 is withdrawn, and the cover may be thrown back. By means of the bolt 18 the valve may be moved until its opening 10ᵃ registers with the opening 20 and the pipe 44 may be inserted in the manner before described. As the pipe 44 enters, it opens the valve 23. At this time the opening 40 registers with the opening 41, and air may enter the tank to prevent the formation of a vacuum.

The pipe 47 is applied to the pipe section 25 and the contents of the tank may be determined or tested in the manner described. The liquid may be withdrawn through the pipe 44 by suction, or it may be forced out by pressure supplied through the pipe 47. The operation of other parts of the apparatus has heretofore been described.

While I have shown my invention embodied in a tank car having a dome, it is of course obvious that my invention may be applied to other kinds of tanks or containers.

I claim:

1. In a device for loading and unloading tank cars having a dome, a cover for said dome, a sliding plate on said cover, the plate and cover having openings adapted to be brought into registry to permit the passage of a pipe therethrough, the plate and cover having a second pair of openings adapted to be brought into registry at the same time, and a check valve connected to the second opening in the cover and yielding to admit air into the car when the contents are being removed.

2. In a device for loading and unloading tank cars having a dome, a cover for said dome, a sliding plate on said cover, the plate and cover having openings adapted to be brought into registry to permit the passage of a pipe therthrough, the plate and cover having a second pair of openings adapted to be brought into registry at the same time, a check valve connected to the second opening in the cover and yielding to admit air into the car when the contents are being removed, and means for moving said plate to bring the openings into registry.

3. In a device for loading and unloading tank cars having a dome, a cover for said dome, a sliding plate on said cover, the plate and cover having openings adapted to be brought into registry to permit the passage of a pipe therethrough, the plate and cover having a second pair of openings adapted to be brought into registry at the same time, a check valve connected to the second opening in the cover and yielding to admit air into the car when the contents are being removed, means for moving said plate to bring the openings into registry, and means for locking the plate with the openings out of registry.

4. In a device for loading and unloading tank cars having a dome, a cover for said dome, a sliding plate on said cover, the plate and cover having openings normally out of registry and adapted to be brought into registry upon sliding movement of the plate for loading and unloading, a lid for said cover, and means for locking the lid in position and at the same time locking the plate in position with the openings out of registry.

5. In a device for loading and unloading tanks, a valve supporting plate on the tank, a valve mounted to slide thereon, a valve stem having a cross head at its outer end, lugs on the valve suporting plate and a bolt extending through said lugs and the cross head of the valve supporting stem.

6. In a device for loading and unloading tanks, a valve supporting plate on the tank, a valve mounted to slide thereon, a valve stem having a cross head at its outer end, lugs on the valve supporting plate, a bolt extending through said lugs and through the cross head of the valve stem, a cover for the valve, and a locking bolt carried thereby adapted to engage said first mentioned bolt.

7. In a device for loading and unloading tanks, a valve supporting plate on the tank, a valve mounted to slide theron, a valve stem having a cross head at its outer end, lugs on the valve supporting plate, a bolt extending through said lugs and through the cross head of the valve stem, a cover hinged to the tank, a locking bolt carried thereby, adapted to engage the first mentioned bolt, and a seal carried by said locking bolt.

8. In a device for loading and unloading tanks having a dome, a cover for said dome having a filling opening, guide flanges on the cover, a valve plate slidable within said guide flanges and provided with an opening adapted in one position of the plate to register with said filling opening, a movable lid for covering said valve plate, and means for locking said lid and plate to the cover with the valve openings out of registry.

9. In a device for loading and unloading tanks having a dome, a cover for said dome having a filling opening, guide flanges on the cover, a valve plate slidable within said guide flanges and provided with an opening adapted in one position of the plate to register with said filling opening, means including a threaded bolt for sliding said valve plate, and a lock bolt connected to the lid, plate and cover for locking the lid and plate against movement with the valve openings out of registry.

10. In a device for loading and unloading tanks having a dome, a cover for said dome having a filling opening, guide flanges on the cover, a valve plate slidable within said guide flanges and provided with an opening adapted in one position of the plate to register with said filling opening, means including a threaded bolt for sliding said valve plate, said cover having an integral upstanding wall provided with a threaded opening for receiving the threaded bolt, a locking bolt extending through openings in the lid and threaded bolt for locking the lid and plate against movement with the valve openings out of registry, and means for locking and sealing the locking bolt.

In testimony whereof, I have hereunto subscribed my name.

WILLIAM C. SHANLEY.